(12) United States Patent
Horst

(10) Patent No.: US 8,146,974 B2
(45) Date of Patent: Apr. 3, 2012

(54) EXPANDABLE GRAIN TANK FOR AGRICULTURAL COMBINES

(75) Inventor: Andrew Horst, Reading, PA (US)

(73) Assignee: CNH America LLC, New Holland, PA (US)

( * ) Notice: Subject to any disclaimer, the term of this patent is extended or adjusted under 35 U.S.C. 154(b) by 220 days.

(21) Appl. No.: 12/553,414

(22) Filed: Sep. 3, 2009

(65) Prior Publication Data

US 2011/0049927 A1    Mar. 3, 2011

(51) Int. Cl.
*B60P 3/22* (2006.01)
(52) U.S. Cl. .......... 296/15; 296/26.07; 460/23; 460/119
(58) Field of Classification Search .................... 296/15, 296/26.07, 100.18, 160, 163, 165; 460/23, 460/119, 150; 56/324; 220/315, 345.5, 349, 220/351
See application file for complete search history.

(56) References Cited

U.S. PATENT DOCUMENTS

| | | |
|---|---|---|
| 4,008,819 A | 2/1977 | Hanaway |
| 4,029,228 A | 6/1977 | Shaver |
| 4,106,649 A | 8/1978 | Nelson et al. |
| 4,466,549 A | 8/1984 | Hanaway |
| 4,493,601 A | 1/1985 | Hill et al. |
| 4,544,196 A | 10/1985 | Schmeichel et al. |
| 4,846,198 A | 7/1989 | Carnewal et al. |
| 4,887,400 A | 12/1989 | Carroll |
| 4,960,300 A | 10/1990 | Burvee |
| 5,151,064 A | 9/1992 | Damman et al. |
| 5,427,572 A | 6/1995 | Deutsch et al. |
| 5,429,403 A | 7/1995 | Brasher |
| 6,053,552 A * | 4/2000 | Krull ............................. 296/15 |
| 6,325,447 B1 * | 12/2001 | Kuo ............................. 296/165 |
| 6,508,705 B1 * | 1/2003 | Van Overschelde ............ 296/15 |
| 6,679,772 B2 | 1/2004 | Johnson et al. |
| 6,692,352 B2 | 2/2004 | Gerber et al. |
| 6,712,421 B1 | 3/2004 | Wilson |
| 6,752,715 B2 | 6/2004 | Stephens et al. |
| 7,101,280 B2 | 9/2006 | Colpaert |
| 7,281,975 B2 | 10/2007 | Lukac et al. |

* cited by examiner

*Primary Examiner* — Lori Lyjak
(74) *Attorney, Agent, or Firm* — Michael G. Harms

(57) ABSTRACT

An expandable grain tank is provided for covering the open end of a grain tank of an agricultural combine. The expandable tank includes a tarp and a support structure for raising and lowering the tarp. The support structure is configured with an upper frame, a plurality of expandable legs connected to the upper frame and the grain tank, and an actuator to expand and retract the expandable legs. The expandable tank is configured to be moved between a retracted position and an expanded position.

12 Claims, 5 Drawing Sheets

EXPANDABLE GRAIN TANK FOR AGRICULTURAL COMBINES

BACKGROUND OF THE INVENTION

The present invention relates to an expandable grain tank for an agricultural combine harvester. In particular, the present invention relates to a grain tank with a self expandable cover/tank.

It has been known in the prior art relating to grain tanks/ bins for use with agricultural combines to provide tank side wall extensions for such grain tanks which are manually raised from a lowered, storage position to an elevated or "harvest" grain-retaining position in order to increase the storage capacity of the grain tank and/or to prevent spillage of the heaped grain. Such tank wall extensions are held in the raised position by mechanical securing or fastening means. In the prior art arrangement, the tank wall extensions remained in the raised position until they were manually lowered by the operator by releasing the securing or fastening means which held the tank wall extensions in their raised vertical position.

In the prior art arrangement, when the grain tank extensions are in their raised position, they cause the grain tank with the raised extensions to have a vertical height greater than that which is practical for the transporting and storage limits of the combine. Hence, in the prior art arrangement when the grain tank is not in use and before transporting or storing the combine, the grain tank extensions should be folded down into a retracted position. However, these extensions are often heavy and awkward to open and close, due in part to such extensions having to be manually operated and offer no or little protection against weather conditions.

Accordingly, a need exists for an expandable grain tank that addresses the aforementioned problems and offers a protective cover when the grain tank is either full or empty.

BRIEF SUMMARY OF THE INVENTION

In accordance with a preferred embodiment, the present invention provides an expandable grain tank for an agricultural combine comprising: a grain tank that includes: a plurality of panels forming the grain tank, and an open upper portion; a tarp connectable to the upper portion of the grain tank; a support structure connectable to the grain tank and the tarp, the support structure including: an upper frame for connecting to the tarp, a plurality of expandable legs connected to the upper frame and the grain tank, and a plurality of actuators configured to control the plurality of expandable legs and move the legs between an expanded position and a retracted position.

In accordance with another preferred embodiment, the present invention provides a grain tank comprising: a plurality of panels configured as a tank having an open upper portion; and an expandable tank connected to the grain tank to completely enclose the open upper portion of the tank; the expandable tank including: a flexible collapsible tank portion; and a support structure connected to the flexible collapsible tank portion and configured to position the expandable tank between a retracted position and an expanded position, the support structure including: at least one expandable extension connected to the tank for moving the expandable tank between a retracted position and an expanded position, and at least one actuator configured to move the expandable extension between an extended position and a retracted position.

In accordance with yet another preferred embodiment, the present invention provides a cover for a grain tank comprising: a tarp portion configured to completely enclose an upper portion of the grain tank; a frame for supporting the tarp portion above the tank, and a frame structure connected to the tarp portion and the frame, the frame including at least one powered expandable extension for moving the frame between an extended position and a retracted position for raising and lowering the frame.

In accordance with a further preferred embodiment, the present invention provides a grain tank assembly comprising: a grain tank having an open upper portion; and an expandable tank connected to the grain tank to completely enclose the open upper portion of the grain tank, the expandable tank including: a flexible collapsible tank portion; a support structure connected to the flexible collapsible tank portion and configured to position the expandable tank between a retracted position and an expanded position, the support structure including at least one spring loaded expandable leg extension connected to the grain tank and the support structure, wherein the spring loaded expandable leg extension is biased to expand the expandable leg extensions to move the expandable tank to the expanded position; a floating bubbler auger operatively connected to the grain tank for filling the grain tank with a crop material, wherein the floating bubbler auger rises within the grain tank as the grain tank fills with crop material; and a connector connectable to the floating bubbler auger and the support structure for maintaining the support structure in the retracted position; wherein the at least one spring loaded expandable leg extension is configured to expand as the floating bubbler auger rises within the grain tank.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
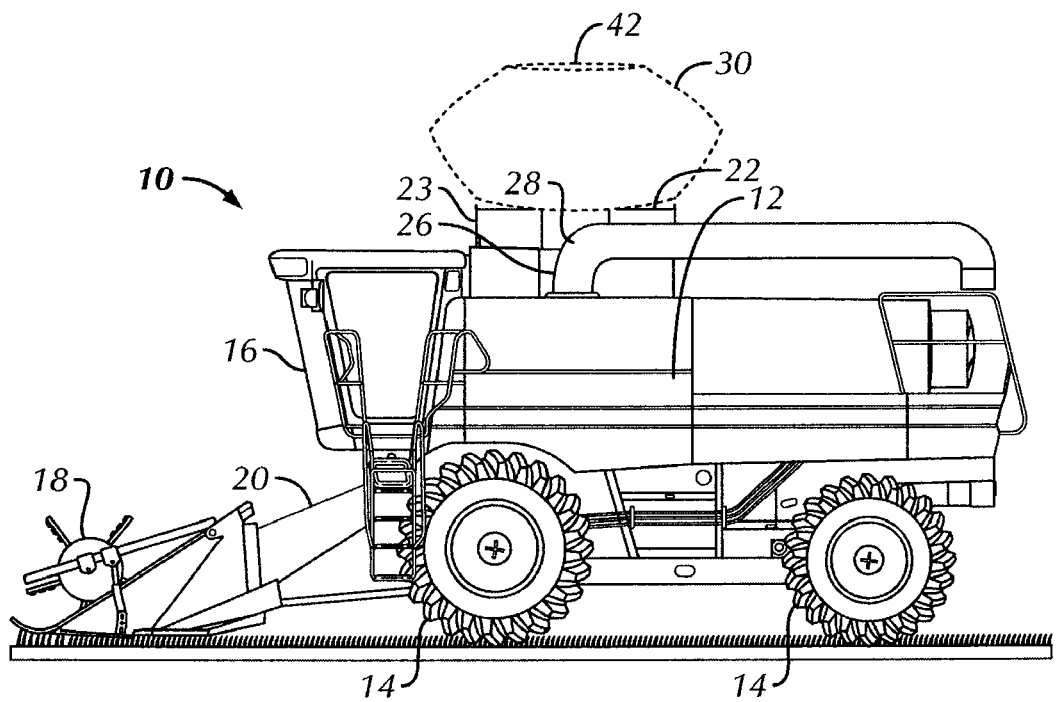
FIG. 1 is a side, elevational view of an agricultural combine having an expandable grain tank in accordance with a preferred embodiment of the present invention.

Referring now to FIG. 1, there is shown a self-propelled agricultural combine 10. The combine 10 includes a body 12 supported by wheels 14 and an engine (not shown) for driving the wheels 14 to allow the combine 10 to move from place to place. An operator's station 16 is positioned towards the forward end of the combine body 12 and includes numerous controls to allow the operator to adjust the functions of the combine 10.

At the forward end of the combine 10 is a crop harvesting header 18 that severs and gathers the ripened crop materials from the crop field. After cutting the stems of the crop materials or collecting the crop materials from a prepared windrow, the crop materials are fed rearward through a feeder housing 20 to the combine's internal threshing/cleaning systems (not shown). The threshing/cleaning systems then separates the grain from the unwanted crop residue. After the cleaning system has separated the grain from the crop residue, the grain is transferred to an onboard storage bin or grain tank 22 by a transfer system, such as an augering system that can include a bubbler auger 24 (FIG. 2), and the unwanted crop residue is discharged from the rear end of the combine 10 onto the harvested crop field. When the onboard storage tank 22 becomes full with grain, an unloading tube 26 empties the grain from the storage bin 22 into e.g., a truck or a grain cart (not shown). The general arrangement of the agricultural combine 10, the augering system, etc., is known in the art. For example, U.S. Pat. No. 4,846,198, the disclosure of which is hereby incorporated herein by reference in its entirety, generally discloses the structure and operation of such combine 10 systems.

Figure 2:
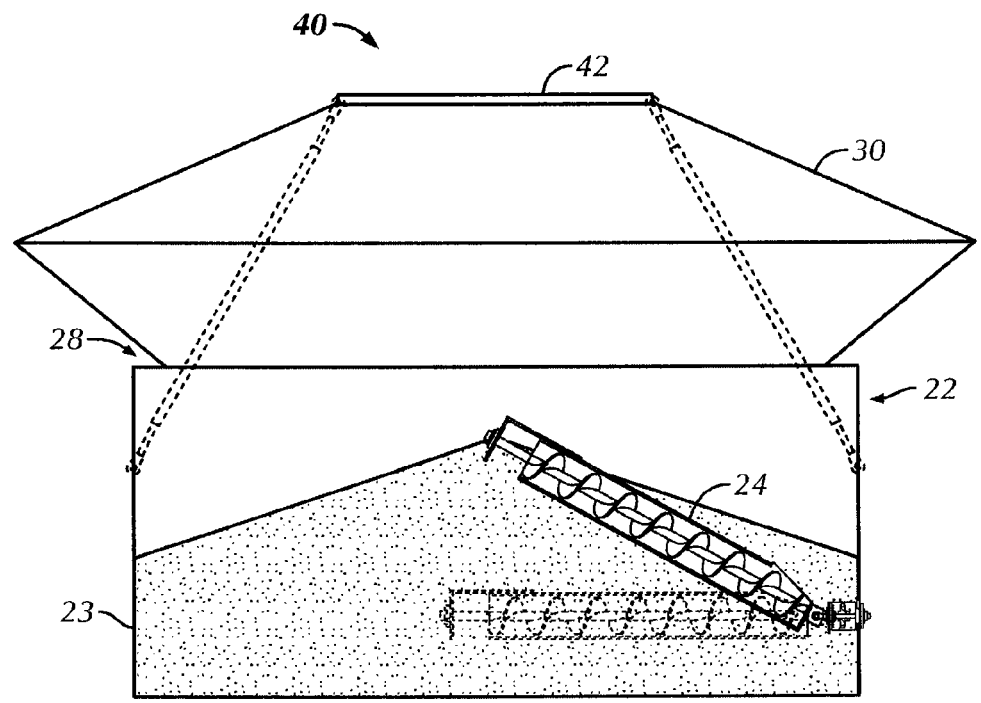
FIG. 2 is a partial side, cross-sectional, elevational view of the expandable grain tank of FIG. 1 with a bubbler auger in a raised position.

Referring to FIGS. 1 and 2, the grain tank 22 is generally configured as a four sided tank 22 formed by a plurality of panels 23 with an open upper portion 28. A bubbler auger 24 can be operatively engaged with the grain tank 22 for discharging grain or other crop material collected by the combine 10 into the grain tank 22. The bubbler auger 24 can be a pivotally mounted or floating auger conveyor that is positioned within the grain tank 22. The bubbler auger 24 is a "floating" auger because as the grain level in the grain tank 22 rises, the bubbler auger 24 moves angularly upwards from a generally horizontal position due to an upward thrust on the auger 24 caused by the reaction forces of the grain discharging from the auger 24 against the upper surface of the already loaded grain. The general structure, operation and function of such floating bubbler augers 24 is known in the art and a detailed description of them is not necessary for a complete understanding of the present invention. However, an exemplary floating bubbler auger 24 are described in U.S. Pat. Nos. 4,008,819 and 4,029,228, the disclosures of which are hereby incorporated herein by reference in their entirety. In sum, the bubbler auger 24 can be a floating bubbler auger 24 or a self-rising bubbler auger that is operatively connected to the grain tank 22 for filling the grain tank 22 with crop material. The floating bubbler auger 24 rises within the grain tank 22 as the grain tank fills with crop material.

Figure 3:
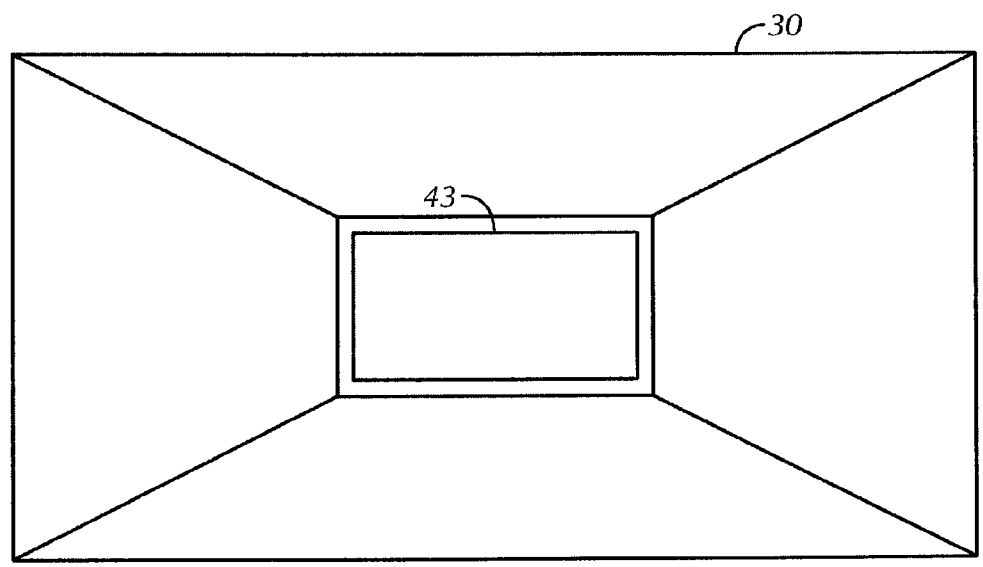
FIG. 3 is a top plan view of the expandable grain tank of FIG. 1.
Figure 4:
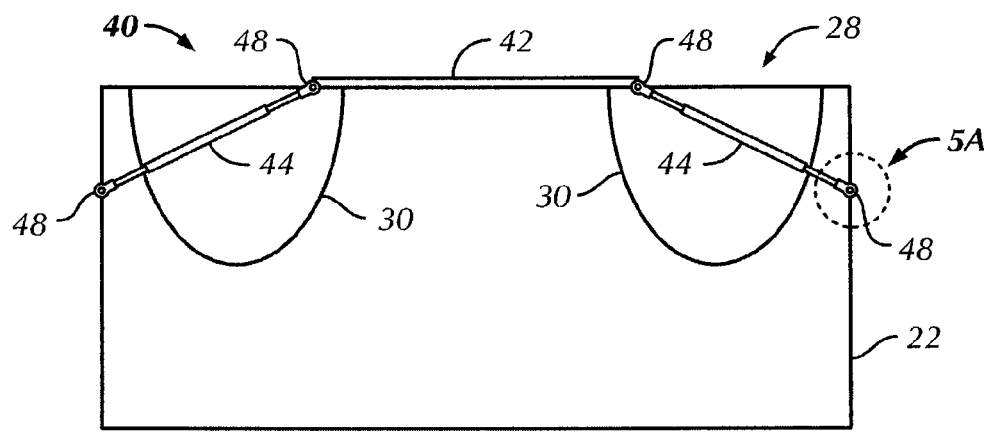
FIG. 4 is a partial side, cross-sectional, elevational view of the expandable grain tank of FIG. 1.
Figure 5:
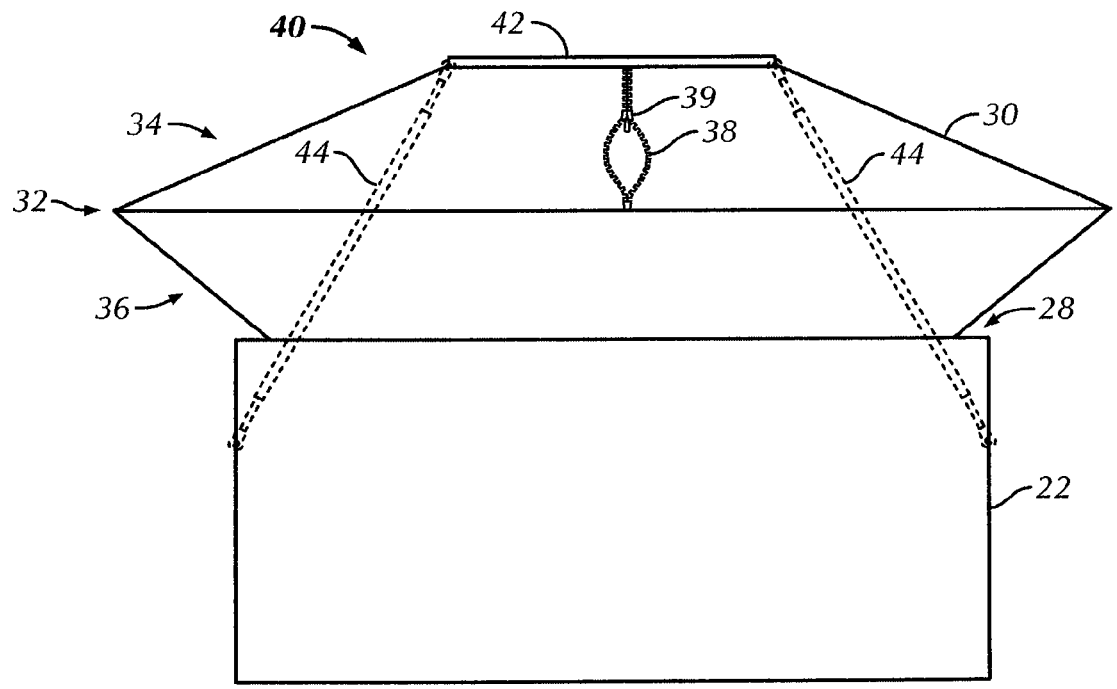
FIG. 5 is a partial side, elevational view of the expandable grain tank of FIG. 1.

Referring to FIGS. 3-5, there is shown an expandable grain tank that includes a tarp 30 connected to the upper portion 28 of the grain tank 22. The tarp 30 can be any tarp known in the art and suitable for its intended use, such as and not limited to, a durable, flexible material of textile, plastic, or composite. With one end of the tarp 30 connected to the upper portion 28, an opposite end of the tarp 30 is connected to a support structure 40, such as an upper frame 42 of the support structure 40. That is, the tarp 30 is configured to sealingly connect to the upper portion 28 and the support structure 40 so as to form a sealed enclosure. The tarp 30 can be connected by any fastening member generally known in the art, such as nuts and bolts, tethers, adhesives, rope or the like. FIG. 4 illustrates the tarp 30 and support structure 40 in the closed or retracted position. FIG. 5 illustrates the tarp 30 and support structure 40, in the open or expanded position. Preferably, the tarp 30 is configured with a wider middle portion 32 relative to its top portion 34 or bottom portion 36.

The tarp 30 can also include a resealable access opening 38 for allowing access to the grain tank 22 interior when the tarp 30 and support structure 40 are in the expanded or retracted position. The resealable access opening 38 can be opened and closed by a sealing mechanism 39, such as a zipper 39 or hook and loop fasteners. While the preferred embodiment of the present invention is herein described with reference to a tarp 30, (i.e., a flexible collapsible tank portion) alternative enclosure means, such as a collapsible pleated structure, etc., are applicable to the present invention.

Figure 4A:
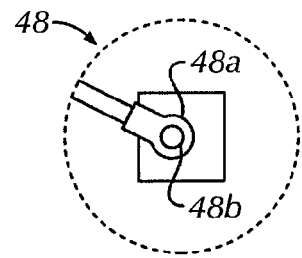
FIG. 4A is a partial side, elevational view of a pivot mechanism connection for connecting the expandable legs of the expandable grain tank of FIG. 1.

The support structure 40 is connectable to the grain tank 22 and includes an upper frame 42 and a plurality of expandable legs 44 (only two shown for convenience). Preferably, the support structure 40 includes four (4) expandable legs 44. One end of each of the expandable legs 44 is pivotably connected to an inside surface or interior portion of the grain tank 22 about an upper portion of the grain tank 22 but below the top surface of the grain tank 22. The other end of each of the expandable legs 44 is pivotably connected to the upper frame 42. The pivotable connection 48 for connecting to the grain tank 22 and support structure 40 can be a conventional ball and socket connection, a hook and loop connection, or the like. Preferably, the pivotable connection 48 includes a loop 48a and a stud 48b about which the loop 48a pivots, as shown in FIG. 4A.

Figure 6:
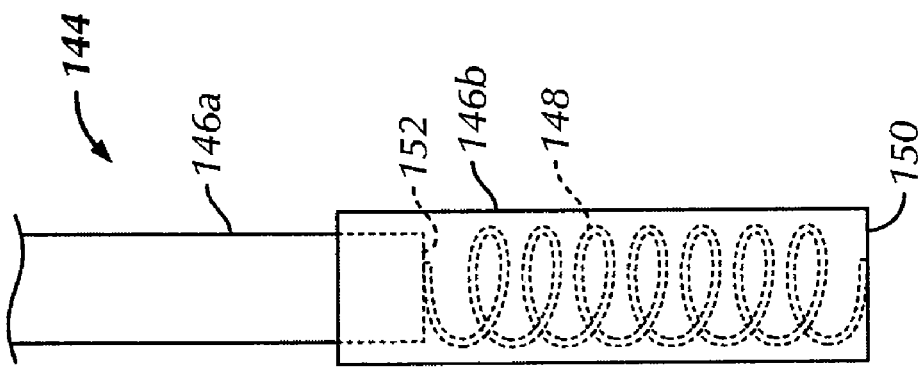
FIG. 6 is a partial enlarged, side, elevational view of an expandable leg of the expandable grain tank of FIG. 1.

The expandable legs 44 are preferably spring loaded expandable legs 144 or spring loaded extensions 144, as shown in FIG. 6. The expandable leg 144 is generally configured as telescoping extensions and includes a plurality of leg segments, such as leg segments 146a, 146b and a biasing member 148, such as a helical spring 148. The helical spring 148 is positioned within leg segment 146b, which is configured as a hollow leg segment 146b such that one end of the helical spring 148 rests against an end 150 of leg segment 146b and the opposite end of the helical spring 148 engages an end 152 of leg segment 146a. Collectively, the plurality of expandable legs 144 comprise a frame structure for supporting the upper frame or frame 42 between an extended position and a retracted position, thereby raising and lowering the frame 42. The plurality of expandable legs 144 however, are biased by the helical spring 148 to the extended position, such that the frame 42 is biased towards an expanded position.

Figure 7A:
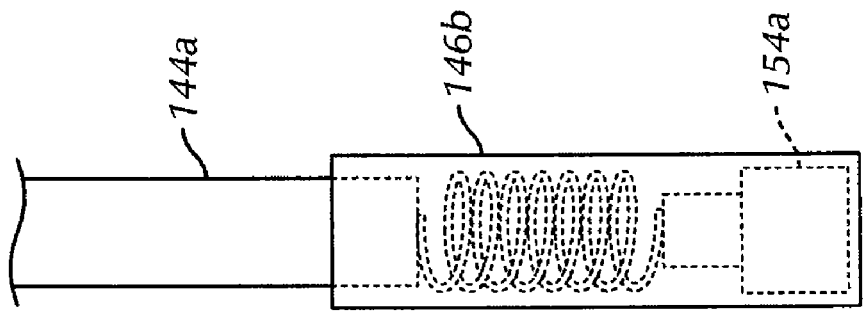
FIG. 7A is a partial enlarged, elevational view of an expandable leg of the expandable grain tank of FIG. 1 with an actuator internal to the expandable leg.
Figure 7:
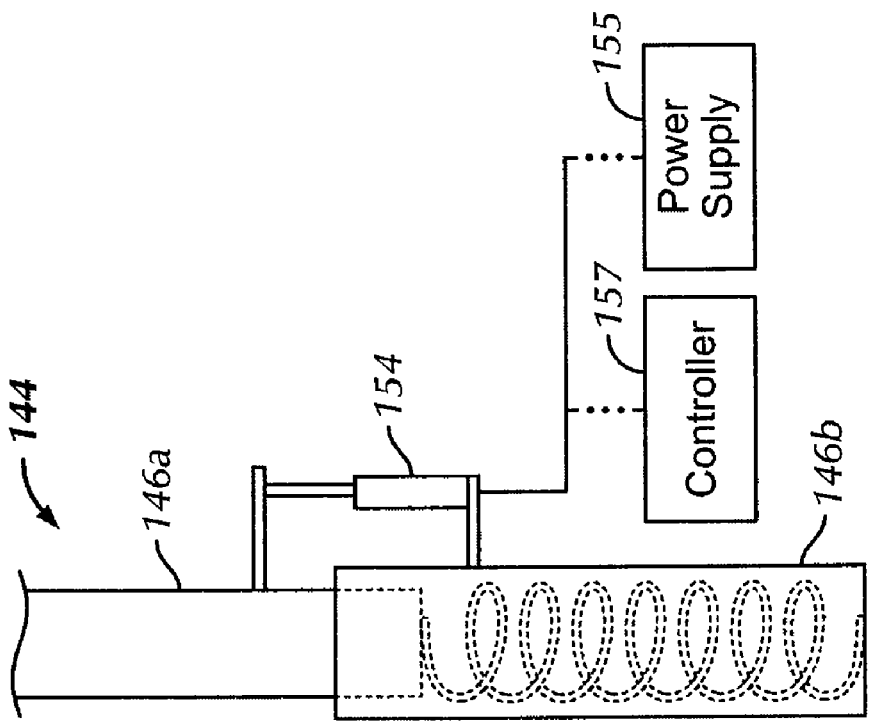
FIG. 7 is a partial enlarged, elevational view of an expandable leg of the expandable grain tank of FIG. 1 with an actuator.

Referring to FIG. 7, the plurality of expandable legs 144 preferably includes a plurality of actuators 154 to provide for remotely controllable powered extension and retraction of each of the expandable legs 144. As shown in FIG. 7, the actuator 154 is configured to drive expansion and retraction of the spring loaded expandable leg 144, thereby raising and lowering the support structure 40 and tarp 30. For example, one end of the actuator 154 can be connected to one leg segment 146b while the other end of the actuator 154 is connected to another leg segment 146a, so as to drive the extension and retraction of the leg segments 146a, 146b in a telescoping manner. When in the expanded position, the plurality of expandable legs 44 extend out of the grain tank 22.

The actuator 154 can be connected to a power supply 155, such as a battery or alternator of the combine 10. The actuator 154 is also operatively connected to a controller 157, such as a computer, programmable logic controller, or the like, that is operable by a user in the operator's station 16. Such power supplies and controllers are well known in the art and a detailed description of their structure, function, and operation is not necessary for a complete understanding of the present invention. The actuator 154 can also be remotely connected to the controller 157, such as by a transmitter/receiver configuration or directly hard wired to the controller 157. The actuator 154 can be a linear actuator, a hydraulic cylinder, or the like that is capable of being remotely controlled. Such actuators are well known in the art and a detailed description of their structure, operation and function is not necessary for a complete understanding of the present invention. Such actuators 154 can be used in combination with a biasing member, as shown in FIG. 7, or without any biasing member.

Referring to FIG. 7A, the actuator 154a can alternatively be disposed within the leg 146b, with or without a biasing member. Thus, in operation, the actuator 154a will expand and retract the leg segments 146a, 146b upon expansion and retraction of the actuator 154a.

In general, the actuator 154 can be configured in any manner so as to provide for the powered extension and retraction of the expandable legs 144 and move the expandable legs between an expanded position and a retracted position. That is, the powered extension is provided for by the actuator 154, which is a mechanically powered means of driving the extension and retraction of the expandable legs 44.

Referring back to FIGS. 3 and 4, the upper frame 42 is generally configured as a substantially planar frame. Preferably, the upper frame 42 is configured as a square frame or rectangular frame 42 and smaller in length and width than the upper portion 28 of the grain tank. The upper frame 42 can be made from any rigid material suitable for its intended use, such as a metal, plastic, or composite material. The upper frame 42 can optionally include an access opening or door 43 to allow access to the grain tank 22 when the support structure 40 is in the expanded or retracted position. The access door 43 can be of any door or opening configuration that is well known in the art to allow a user thru-access. The upper frame 42 in combination with the tarp 30 comprises an expandable tank that completely encloses the open upper portion 28 of the grain tank 22, thereby providing a protected enclosure for increasing the capacity of the grain tank 22, in addition to providing protection from the environment and preventing spillage of grain or crop materials.

In summary, the tarp 30 and support structure 40 collectively form an expandable tank connected to the grain tank 22 that can completely enclose the open upper portion 28 of the grain tank 22. The tarp 30 being made of a flexible material forms a flexible collapsible tank while the support structure 40 provides a means to expand and retract the flexible collapsible tank.

In operation, the grain tank 22 can be used with the support structure 40 in either the expanded position or retracted position. In the retracted position, the support structure 40 is substantially within or collapsed about the grain tank 22 and can be used as any conventional grain tank 22. However, when a user desires to increase the capacity of the grain tank 22, the user can expand the grain tank 22 holding capacity by expanding the support structure 40 to the expanded position, as shown in FIG. 5. To expand the support structure 40, the user activates the remotely controllable actuator 54 to expand the expandable legs 44 from the retracted position to the extended position. As the expandable legs 44 extend, they move the upper frame 42 upwards, along with the tarp 30. As the upper frame 42 and tarp 30 move to the fully expanded position, the tarp 30 and upper frame 42 form an expandable tank enclosure that completely encloses the open upper portion 28 of the grain tank 22.

Figure 8:
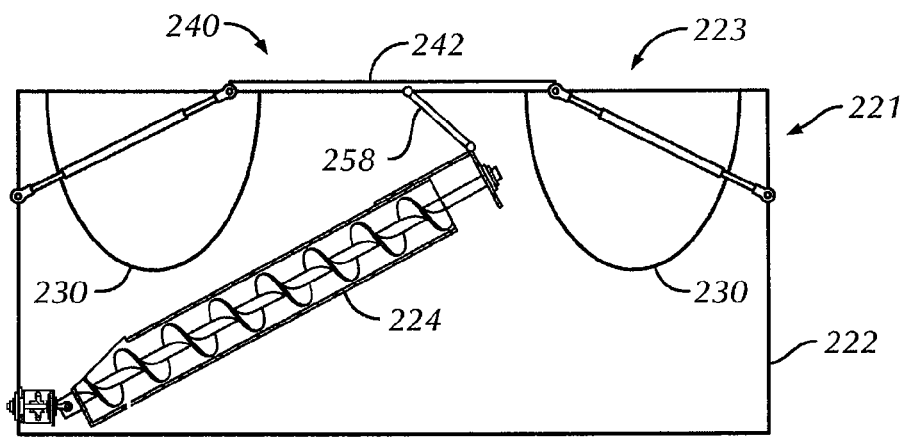
FIG. 8 is a partial side, cross-sectional, elevational view of a grain tank assembly in a retracted position in accordance with another preferred embodiment of the present invention.
Figure 9:
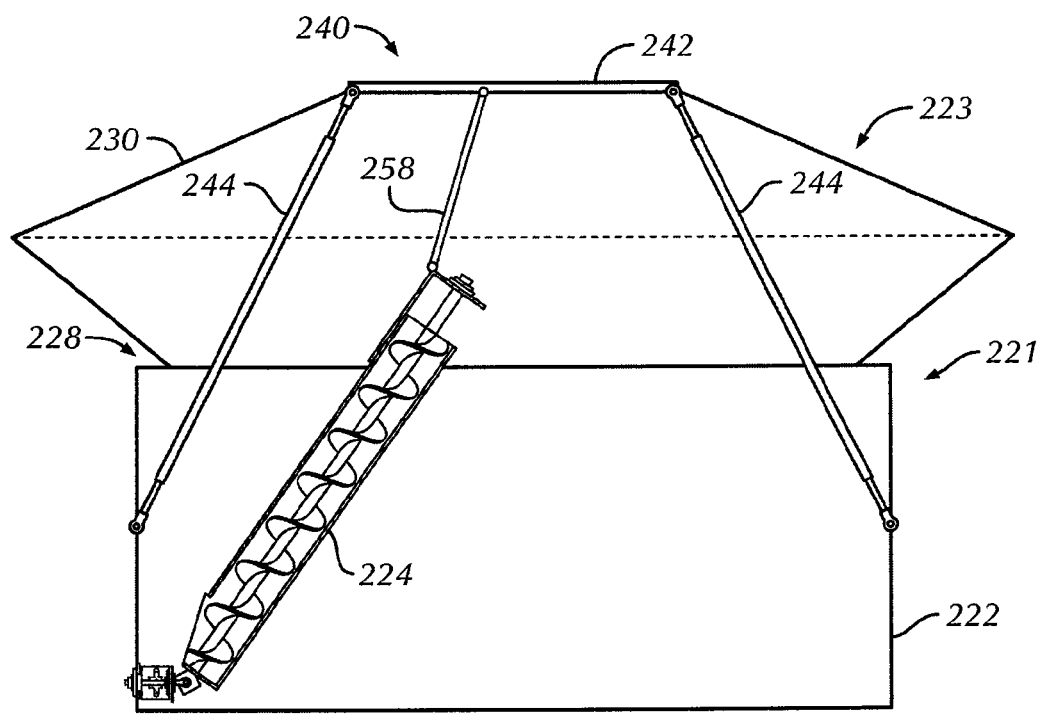
FIG. 9 is a partial side, cross-sectional, elevational view of the grain tank assembly of FIG. 8 in the expanded position.

FIGS. 8 and 9 illustrate another preferred embodiment of the present invention. In particular, the present embodiment provides a grain tank assembly 221 that includes a grain tank 222, an expandable tank 223, a floating bubbler auger 224, and a connector 258. The expandable grain tank 223 is connected to the grain tank 222 to completely enclose an upper portion 228 of the grain tank 222. The expandable tank 223 includes a flexible collapsible tank portion 230 and a support structure 240. The support structure 240 is connected to the flexible collapsible tank portion 230 and configured to position the expandable tank 223 between a retracted position (FIG. 8) and an expanded position (FIG. 9). The support structure 240 includes at least one spring loaded expandable leg extension 244, similarly constructed as spring loaded expandable legs 144, and preferably four spring loaded expandable leg extensions 244. The spring loaded expandable leg extension 244 is biased by a spring (not shown) to move the support structure 240 upwards so that the expandable tank 223 is moved to the expanded position.

A floating bubbler auger 224 is operatively connected to the grain tank 222 for filling the grain tank with a crop material. As the floating bubbler auger 224 fills the grain tank 222, the floating bubbler auger 224 rises, as further described in detail above.

A connector 258 is connectable to the floating bubbler auger 224 at one end and an upper frame 242 at the other end. Preferably, the connector 258 is connected to the floating bubbler auger 224 at its most superior or highest point, such as shown in FIGS. 8 and 9. The connector 258 can be made from any material suitable for its intended use, such as a chain, rope, wire, cable, or the like. The connector 258 is sized such that when the floating bubbler auger 224 is within the grain tank 222, the expandable tank 223 is in the retracted position. Furthermore, when the floating bubbler auger 224 starts to rise, the spring loaded expandable legs 244 are then allowed to expand and raise the expandable tank 223 to a position or height above the floating bubbler auger 224 corresponding to the size or length of the connector 258. In other words, the spring loaded expandable leg extension 244 is configured to expand and raise the expandable tank 223 concurrently as the floating bubbler auger 224 rises within the grain tank 222. In sum, the present embodiment advantageously provides for an expandable tank 223 that automatically expands and retracts as the bubbler auger 224 rises and lowers within the grain tank 22 to provide additional grain storage capacity on an as needed basis.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. An expandable grain tank for an agricultural combine comprising:
   a grain tank that includes:
   a plurality of panels forming the grain tank, and
   an open upper portion;

a tarp connectable to the upper portion of the grain tank;

a support structure connectable to the grain tank and the tarp, the support structure including:

an upper frame for connecting to the tarp, wherein the upper frame includes an access opening, a plurality of expandable legs connected to the upper frame and the grain tank, and a plurality of actuators configured to control the plurality of expandable legs and move the legs between an expanded position and a retracted position.

2. The expandable grain tank of claim 1, further comprising:

an auger operatively engaged with the grain tank for filling the grain tank with a crop material; and a connector connectable to the upper frame and the auger.

3. The expandable grain tank of claim 1, wherein the support structure is substantially within the grain tank when in the retracted position.

4. The expandable grain tank of claim 1, wherein the plurality of expandable legs extend out of the grain tank in the expanded position.

5. The expandable grain tank of claim 1, wherein the plurality of expandable legs are connected to an interior portion of the grain tank.

6. The expandable grain tank of claim 1, wherein the plurality of expandable legs are spring loaded expandable legs.

7. The expandable grain tank of claim 1, wherein the plurality of expandable legs includes four expandable legs.

8. The expandable grain tank of claim 1, wherein the tarp includes a resealable access opening.

9. The expandable grain tank of claim 1, wherein the upper frame is a substantially planar frame.

10. The expandable grain tank of claim 1, wherein the actuator is a remotely controlled actuator.

11. A grain tank comprising:

a plurality of panels configured as a tank having an open upper portion; and an expandable tank connected to the grain tank to completely enclose the open upper portion of the tank, the expandable tank including:

a flexible collapsible tank portion;

a support structure connected to the flexible collapsible tank portion and configured to position the expandable tank between a retracted position and an expanded position, the support structure including:

at least one expandable extension connected to the tank for moving the expandable tank between a retracted position and an expanded position, and at least one actuator configured to move the expandable extension between an extended position and a retracted position;

an auger operatively engaged with the grain tank for filling the grain tank with a crop material; and a connector connectable to the expandable tank and the auger.

12. A cover for a grain tank comprising:

a tarp portion configured to completely enclose an upper portion of the grain tank;

a frame configured to support the tarp portion above the tank, and a frame structure connected to the tarp portion and the frame, the frame including at least one powered expandable extension for moving the frame between an extended position and a retracted position for raising and lowering the frame;

an auger operatively engaged with the grain tank for filling the grain tank with a crop material; and a connector connectable to the frame and the auger.

\* \* \* \* \*